United States Patent
Wang et al.

(10) Patent No.: US 12,483,594 B2
(45) Date of Patent: Nov. 25, 2025

(54) RAILWAY VIDEO RESOURCE INTERCONNECTION AND CONVERGENCE SYSTEM AND METHOD

(71) Applicant: CRSC COMMUNICATION & INFORMATION GROUP COMPANY LTD, Beijing (CN)

(72) Inventors: Mingxia Wang, Beijing (CN); Lejun Zhang, Beijing (CN); Jingfeng Zhang, Beijing (CN); Tao Zhang, Beijing (CN); Wenhao Liu, Beijing (CN); Haobo Xing, Beijing (CN); Qiang Zhu, Beijing (CN)

(73) Assignee: CRSC COMMUNICATION & INFORMATION GROUP COMPANY LTD, Beijing (CN)

( * ) Notice: Subject to any disclaimer, the term of this patent is extended or adjusted under 35 U.S.C. 154(b) by 255 days.

(21) Appl. No.: 18/028,507

(22) PCT Filed: Sep. 30, 2021

(86) PCT No.: PCT/CN2021/122237
§ 371 (c)(1),
(2) Date: Mar. 24, 2023

(87) PCT Pub. No.: WO2022/193618
PCT Pub. Date: Sep. 22, 2022

(65) Prior Publication Data
US 2023/0336590 A1    Oct. 19, 2023

(30) Foreign Application Priority Data
Mar. 15, 2021    (CN) .......................... 202110274924.0

(51) Int. Cl.
H04L 29/06    (2006.01)
G06V 20/52    (2022.01)
H04L 9/40    (2022.01)

(52) U.S. Cl.
CPC .............. *H04L 63/20* (2013.01); *G06V 20/52* (2022.01); *H04L 63/10* (2013.01)

(58) Field of Classification Search
CPC ....... H04L 63/20; H04L 63/10; H04L 63/166; H04L 63/104; H04L 63/0263; H04L 63/107
See application file for complete search history.

(56) References Cited

U.S. PATENT DOCUMENTS

| | | | |
|---|---|---|---|
| 10,878,678 B2 * | 12/2020 | Flyborg | ................. H04N 7/181 |
| 2001/0052011 A1 | 12/2001 | Nagao | |
| 2004/0223498 A1 | 11/2004 | Sanderson et al. | |

FOREIGN PATENT DOCUMENTS

| | | |
|---|---|---|
| CN | 102215381 A | 10/2011 |
| CN | 105141911 A | 12/2015 |

(Continued)

OTHER PUBLICATIONS

WIPO, International Search Report issued on Dec. 30, 2021.
China Patent Office, CN202110274924.0 First Office Action issued on Aug. 17, 2022.

*Primary Examiner* — Longbit Chai
(74) *Attorney, Agent, or Firm* — Li & Cai Intellectual Property (USA) Office

(57) ABSTRACT

The present disclosure relates to a railway video resource interconnection and convergence system and a convergence method. The system includes: a security device and a railway video sharing cloud platform. The security device is configured to map, under the condition that a first resource network is physically isolated from other resource networks, an internet protocol address of the first resource network of (Continued)

video resources to an internet protocol address of a shared network; and the railway video sharing cloud platform is configured to acquire a stream of the video resources, and convert the stream of the video resources into a stream of a preset standard format. The present disclosure solves the problem of secure and effective integration of video resources of a professional video monitoring system in a railway and a comprehensive video monitoring system.

12 Claims, 3 Drawing Sheets

(56) References Cited

FOREIGN PATENT DOCUMENTS

| | | | | |
|---|---|---|---|---|
| CN | 105491066 | A | | 4/2016 |
| CN | 10-719-7208 | A | * | 9/2017 |
| CN | 107306263 | A | | 10/2017 |
| CN | 206908612 | U | | 1/2018 |
| CN | 104951775 | B | * | 2/2018 |
| CN | 108848338 | A | | 11/2018 |
| CN | 105141911 | B | * | 2/2019 |
| CN | 11-008-7147 | A | * | 8/2019 |
| CN | 110113620 | A | | 8/2019 |
| CN | 110278223 | A | | 9/2019 |
| CN | 110430196 | A | | 11/2019 |
| CN | 11-158-5979 | | * | 8/2020 |
| CN | 113014885 | A | | 6/2021 |

* cited by examiner

RAILWAY VIDEO RESOURCE INTERCONNECTION AND CONVERGENCE SYSTEM AND METHOD

TECHNICAL FIELD

The present disclosure provides a railway video resource interconnection and convergence system and method, which relates to the technical field of network communication and video monitoring.

BACKGROUND

As one of the indispensable vehicles for modern travel, the railway has the characteristics of continuity, globality, dynamics, openness and all-weather operation in the transportation and production process. The video monitoring system is favored by the railway operation departments due to the advantages of intuition and high efficiency, and in combination with the railway development, provides powerful guarantee for railway production operation and security management.

The existing railway video monitoring system mainly includes two types: a first type is professional video monitoring system, which is constructed and managed in a divisional manner by departments of the railway transportation and production in early time; and a second type is comprehensive video monitoring system, which is built in combination with high-speed railways and key line engineering construction in recent years. The professional video monitoring system is more complex, including local videos which are not networked, video systems which are independently networked by means of a railway internal bearer network (for transmission or data communication), video systems which are borne in a comprehensive information network, and video systems which are interconnected and transmitted by means of a public network. The professional videos are built and maintained by various service departments in management, IP addresses of the video systems are basically planned respectively, repeatedly used, and cannot be directly interconnected. The comprehensive video monitoring system is born on an internal railway bearer network data communication network, physically isolated from the public network, uniformly planned and distributed with IP addresses, and networked as a whole.

The existing railway video monitoring system mainly has the following problems. Firstly, due to different construction times, construction main bodies and standards adopted, the current video monitoring systems used in railways have different standards, causing the problems of multiple system levels, node dispersion, poor reliability of storage devices and the like, so that the railway video monitoring system has poor video resource manageability and maintainability, and the difficulty of network security protection is increased. Secondly, the current application of video resources in stations basically stays in the stage of "watching in real time and checking history", which has not formed efficient integration with other operation systems yet, and the application mode mainly stays in the stage of driving people by services and then driving a video system by people to perform service operation. Thirdly, networking and applications of the comprehensive video monitoring system and the professional video monitoring system are independent of each other and cannot be communicated, so that video resources cannot be shared, and a user has to maintain and use the video resources among various video systems, resulting in great inconvenience to the user. Fourthly, interconnection and intercommunication among different video monitoring systems are traditionally implemented through physical network communication, address mapping or other manners, which not only influences the independence, compatibility and expandability of the existing networks, but also fails to protect independent, safe and effective operation of each network.

SUMMARY

In view of the above problems, an objective of the present disclosure is to provide a railway video resource interconnection and convergence system and method which can realize centralized control, unified scheduling and resource sharing of railway video services.

In order to achieve the above object, the present disclosure adopts the following technical solutions:

In a first aspect, the present disclosure provides a railway video resource interconnection and convergence system, including: a security device and a railway video sharing cloud platform; wherein
  the security device is configured to map, under the condition that a first resource network is physically isolated from other resource networks, an internet protocol address of the first resource network of video resources to an internet protocol address of a shared network; wherein the first resource network is a network where the video resources are located, and the other resource networks are networks where other video resources are located; the shared network is a network corresponding to the railway video resource interconnection and convergence system; and the video resources and the other video resources are video resources of a railway video monitoring system; and
  the railway video sharing cloud platform is configured to acquire, according to the internet protocol address of the shared network corresponding to the video resources, a stream of the video resources, and convert the stream of the video resources into a stream of a preset standard format. and/or convert a stream of a standard format corresponding to the video resources into code streams of other formats.

Further, the security device is further configured to perform security detection on the video resources.

Further, the security device includes at least one of a firewall, an intrusion detection system, or a gatekeeper.

Further, the video resources include at least one of video camera resources, national standard platform video resources, railway standard platform video resources, network video recorder video resources, or hard disk video recorder video resources.

Further, converting the stream of the video resources into the stream of the preset standard format includes: decapsulating a packet corresponding to the video resources, and converting the decapsulated packet into an elementary stream; and converting the stream of the standard format corresponding to the video resources into the code streams of other formats includes: receiving a video acquisition request including a video stream type and a protocol type; and re-coding the elementary stream corresponding to the video resources into a stream of the video stream type, and encapsulating the stream of the video stream type according to the protocol type.

Further, the railway video resource interconnection and convergence system further includes a client; wherein the client is configured to display the video resources.

In a second aspect, a convergence method based on the railway video resource interconnection and convergence system as described above is disclosed. The convergence method includes: accessing, via a security device of the railway video resource interconnection and convergence system, a video device to a railway video sharing cloud platform of the railway video resource interconnection and convergence system, wherein the video device is a device in a railway video monitoring system; and writing a resource directory of the video device into a database connected to the railway video sharing cloud platform, wherein the resource directory of the video device includes a correspondence relationship between video resource IDs of the video device and an ID of the video device.

Further, before accessing, via the security device of the railway video resource interconnection and convergence system, the video device to the railway video sharing cloud platform of the railway video resource interconnection and convergence system, the method further includes: constructing a railway video resource interconnection and convergence system.

Further, accessing, via the security device of the railway video resource interconnection and convergence system, the video device to the railway video sharing cloud platform of the railway video resource interconnection and convergence system includes: receiving an access request sent from the video device by the security device, wherein the access request includes basic information of the video device; verifying the video device according to the access request; saving, under the condition that the verification is passed, the basic information of the video device into the database; and sending, under the condition that the verification fails, information of access rejected to the video device.

Further, under the condition that the video device is a national standard device, the basic information of the video device includes an ID, a domain name, an internet protocol address, a port number, a user name and a password of the video device; and under the condition that the video device is one of a railway standard device, a video camera, a network video recorder or a hard disk video recorder, the basic information of the video device includes an ID, an internet protocol address, a port number, a user name and a password of the video device.

Further, writing the resource directory of the video device into the database connected to the railway video sharing cloud platform includes: sending a signaling for acquiring the resource directory of the video device to the video device; receiving the resource directory sent from the video device, and saving the resource directory into a temporary table of the railway video sharing cloud platform; and reading data records in the temporary table to complete a mounting operation of the resource directory and save the resource directory into the database.

Further, after writing the resource directory of the video device into the database connected to the railway video sharing cloud platform, the method further includes: receiving a video resource acquisition request including a video resource ID, a video stream type and a protocol type; searching the database to acquire a video device corresponding to the video resources according to the video resource ID, and sending a video calling request to the video device corresponding to the video resources; receiving a video stream sent from the video device corresponding to the video resources, and converting the video stream into an elementary stream; and re-coding the elementary stream into a stream of the video stream type, and encapsulating the stream of the video stream type according to the protocol type.

By adopting the above technical solutions, the present disclosure has the following advantages:

1. Aiming at the problem that there is no method for safely and effectively integrating a professional video monitoring system in railways and a comprehensive video monitoring system in the related art, the present disclosure integrates video resources of the original independent networks of railways uniformly, while ensuring independence functions of different systems, and independence and non-intrusiveness of different networks.

2. With a unified coding and decoding technology and a routing redirection technology, the present disclosure performs standard processing and unified convergence on different formats of video resources for comprehensive video monitoring services and professional video monitoring services of railways, to form a video resource sharing cloud platform which externally provides video services with a GB28181 interface, a railway standard C interface and a railway standard A interface, and internally follows a railway standard protocol to uniformly manage the "use, management and control" permissions of the source, calling, controlling, downloading and the like of the video resources.

3. The present disclosure realizes interconnection and convergence of video resources from railway video systems constructed under different standards and specifications, provides video services uniformly to the outside, and thus realizes centralized control, unified scheduling and resource sharing of railway video services, which not only influences the independence, compatibility and expandability of the existing networks, while effectively reducing the network interconnection problem and security risks caused by repeated construction of networks and network interconnection and intercommunication.

4. The present disclosure is in interconnection and intercommunication with a service system to serve for service production, which improves effective application of the existing railway video system, and plays a great role in railway transportation, command and monitoring, emergency disposal, production operation, equipment and facility monitoring, passenger services, security and anti-terrorism, and the like.

In summary, the present disclosure solves the problem of secure and effective integration of video resources of a professional video monitoring system in a railway and a comprehensive video monitoring system. Since an original system networking mode is not changed, operations such as complex routing configuration and physical networking are not required for video resource convergence, and video resource storage can be completed by merely configuring system-related information. Meanwhile, since calling of the video resources involves cross-network calling, the present disclosure integrates a security protection measure, so that network perimeter security is ensured, and video resource convergence and sharing operations are greatly simplified and secured.

BRIEF DESCRIPTION OF DRAWINGS

Various other advantages and benefits will become apparent to those ordinary skilled in the art from reading the following detailed description of preferred implementations. The drawings are only for the purpose of illustrating the preferred implementations and are not to be construed as limiting thereto. Throughout the drawings, like reference numerals refer to like components. In the drawings.

DETAIL DESCRIPTION OF EMBODIMENTS

Figures 1, 2:
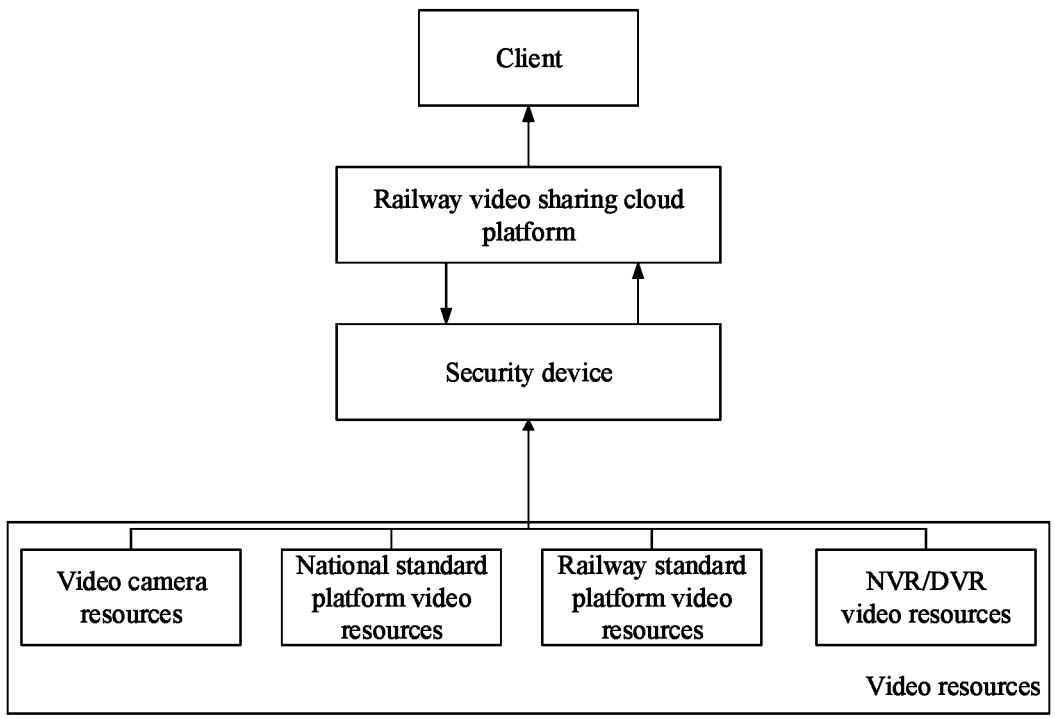
FIG. 1 is a block diagram of a railway video resource interconnection and convergence system according to an embodiment of the present disclosure.
FIG. 2 is a schematic flowchart of a convergence method according to an embodiment of the present disclosure.

Exemplary implementations of the present disclosure will be described in more detail below with reference to the accompanying drawings. While exemplary implementations of the present disclosure are shown in the drawings, it should be understood that the present disclosure can be embodied in various forms and should not be limited to the implementations set forth herein. Rather, these implementations are provided so that the present disclosure will be thoroughly understood, and will fully convey the scope of the present disclosure to those skilled in the art.

It is to be understood that the terminology used herein is for the purpose of describing particular exemplary implementations only and is not intended to be limiting. As used herein, the singular forms "a", "an" and "the" are intended to include the plural forms as well, unless the context clearly indicates otherwise. The terms "comprises," "comprising," "includes," and "including" are inclusive and therefore specify the presence of stated features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. It should also be understood that additional or alternative steps may be used.

For convenience of description, spatially relative terms, such as "inner", "outer", "lower", "upper", and the like, may be used herein to describe the relationship of one element or feature relative to another element or feature as illustrated in the figures. These spatially relative terms are intended to encompass different orientations of the device in use or operation in addition to the orientation depicted in the figures.

As shown in FIG. 1, a railway video resource interconnection and convergence system provided in an embodiment of the present disclosure includes a security device and a railway video sharing cloud platform.

The security device is configured to map, under the condition that a first resource network is physically isolated from other networks, an Internet Protocol (IP) address of the first resource network of video resources to an IP address of a shared network.

Specifically, the security device may be a function device having a Network Address Translation (NAT) function or a Virtual Local Area Network (VLAN) function.

Specifically, the NAT maps a plurality of IP addresses of a resource network to a IP addresses of a shared network using a routing redirection technology, implements network isolation between each resource network (including the first resource network and other resource networks) and the shared network through IP address translation, and realizes information exchange and resource sharing between each resource network and the shared network. The VLAN ensures physical isolation between resource networks (including between the first resource network and another resource network, and between multiple other resource networks). A combination of the NAT and the VLAN ensures resource exchange between the resource networks and the shared network on the basis of physical isolation of the resource networks.

The video resources are video resources of a railway video monitoring system, including various video resources desired to be interconnected and converged.

Specifically, the video resources may include video camera resources, national standard platform video resources, railway standard platform video resources, and Network Video Recorder/Digital Video Recorder (NVR/DVR) video resources.

The video camera resources refer to video camera video resources scattered in the railway system and not accessed to a railway standard platform, a national standard platform or an NVR/DVR. The NVR may mainly function to view, browse, playback, manage, and store video resources of multiple webcams simultaneously. The DVR mainly functions as a video recorder, or a picture divider, or for Pan/Tilt/Zoom (PTZ), alarm control, network transmission and the like, and is configured to enable access of video resources of an analog video camera, but not an IP video camera.

The national standard platform video resources refer to video resources accessed to a national standard platform, and provides videos meeting the format of the national standard (GB/T28181) for the outside.

The railway standard platform video resources refer to video resources accessed to a railway standard platform, and provides videos meeting the format of railway standards and specifications for the outside.

The NVR/DVR video resources mainly refer to a hardware device configured with a railway video monitoring system, and is configured to intensively access video resources of various professional departments of the railway into one or more NVR/DVR devices, so as to facilitate centralized management and control.

The first and other resource networks are all resource networks, which are networks where devices with stored video resources are located. Specifically, if the video resources are video camera resources, each resource network may be a network to which the video camera is accessed; if the video resources are NVR/DVR video resources, each resource network may be a network to which the NVR/DVR is accessed; if the video resources are national standard platform video resources, each resource network may be a network to which the national standard platform is accessed; and if the video resources are railway standard platform video resources, each resource network may be a network to which the railway standard platform is accessed.

A resource network where the video resources being processed by the security device is located is the first resource network, while resource networks except the first resource network are other resource networks. In other words, the first resource network may vary during translation of different IP addresses.

The shared network is a network (or an accessed network) corresponding to the railway video resource interconnection and convergence system of the present disclosure.

In some implementations, the security device may further have a security protection function, and may be configured to perform security detection on the video resources to ensure network security of the shared network.

Specifically, the security device may be a firewall, an intrusion detection system, or a gatekeeper.

The railway video sharing cloud platform is configured to acquire, according to the IP address of the shared network corresponding to the video resources, a stream of the video resources, and convert the stream of the video resources into a stream of a preset standard format; and/or convert a stream of a standard format corresponding to the video resources into other formats of code streams.

Specifically, the railway video sharing cloud platform is a video monitoring platform for integrating and converging video resources, which solves the problems of dispersed, complex independent subnets, network isolation and the like, mainly functions to complete video resource access of various formats, convert code streams of various formats into a unified standard format internally to realize a resource convergence function, and provided a standard stream output externally to realize a resource sharing function.

Specifically, the video resources are encapsulated into packets and sent to the railway video resource interconnection and convergence system through a resource network. When a packet reaches the security device, the security device maps an IP address of the packet (an IP addresses of the resource network in this case) to an IP address of the shared network, and the shared network then sends the packet to the railway video sharing cloud platform according to the mapped IP address.

In some implementations, each packet corresponding to the video resources is decapsulated (i.e., a packet header and/or other additional encapsulation is removed) by the railway video sharing cloud platform, and converted into a standard elementary stream (ES Stream).

In other implementations, after receiving a video acquisition request sent from a user or the like, the railway video sharing cloud platform re-codes the elementary stream corresponding to the video resources according to a video stream type (or video format) in the video acquisition request, such as H264, H265, 4CIF, or MPG4, and encapsulates the recoded elementary stream into a packet in a corresponding format (such as an RTP packet, a PS packet, a railway standard packet, or the like) according to a protocol type in the video acquisition request.

In some embodiments of the present disclosure, the railway video resource interconnection and convergence system further includes a client configured to display the video resources, via which a user may browse the video resources and review video resources in real time through the railway video sharing cloud platform.

In conclusion, the present disclosure solves the network security problem and the address mapping problem caused by network physical isolation and network disconnection by processing video resources of different formats with a security device, so that a railway video sharing cloud platform can be smoothly accessed, code streams of different formats can be converted into a uniform standard format through a protocol conversion service deployed inside the cloud platform, and thus integration and convergence of video resources are completed. The railway video sharing cloud platform provides standard stream output externally, and provides video services with a GB28181 interface, a railway standard C interface, a railway standard A interface or the like externally, while following a railway standard protocol internally to uniformly manage the "use, management and control" permissions of the source, calling, controlling, downloading and the like of the video resources, so that the railway video sharing cloud platform can be docked with a railway standard platform, a national standard platform or any other third-party platform to realize sharing and calling of the video resources.

As shown in FIG. 2, according to an embodiment of the present disclosure, the convergence method based on the above railway video resource interconnection and convergence system includes the following steps S201 to S202.

At S201, accessing, via a security device of the railway video resource interconnection and convergence system, a video device to a railway video sharing cloud platform of the railway video resource interconnection and convergence system, wherein the video device is a device in a railway video monitoring system.

Through the security device of the railway video resource interconnection and convergence system, the railway video sharing cloud platform of the railway video resource interconnection and convergence system may perform information interaction with a video device, so that the video device can be accessed to the railway video sharing cloud platform.

The video device is a device in a railway video monitoring system, i.e., a device where the video resources are located. Specifically, the video device may be a national standard device, a railway standard device, a video camera, an NVR/DVR, or the like.

At S202, writing a resource directory of the video device into a database connected to the railway video sharing cloud platform, wherein the resource directory of the video device includes a correspondence relationship between video resource IDs of the video device and an ID of the video device.

After the video device is accessed to the railway video sharing cloud platform, the railway video sharing cloud platform performs information interaction with the video device through the security device, obtains a resource directory of the video device, and writes a resource directory of the video device into a database connected to the railway video sharing cloud platform.

The resource directory of the video device includes a correspondence relationship between video resource IDs of the video device and an ID of the video device where the video resources are located, and may further include a correspondence relationship between video resource IDs of the video device and locations of the video resources in the video device.

Further, in some implementations, before accessing, via the security device of the railway video resource interconnection and convergence system, the video device to the railway video sharing cloud platform of the railway video resource interconnection and convergence system, the method further includes: constructing a railway video resource interconnection and convergence system.

Since the convergence method of the embodiment is based on the railway video resource interconnection and convergence system, it is natural to construct the railway video resource interconnection and convergence system.

Figure 3:
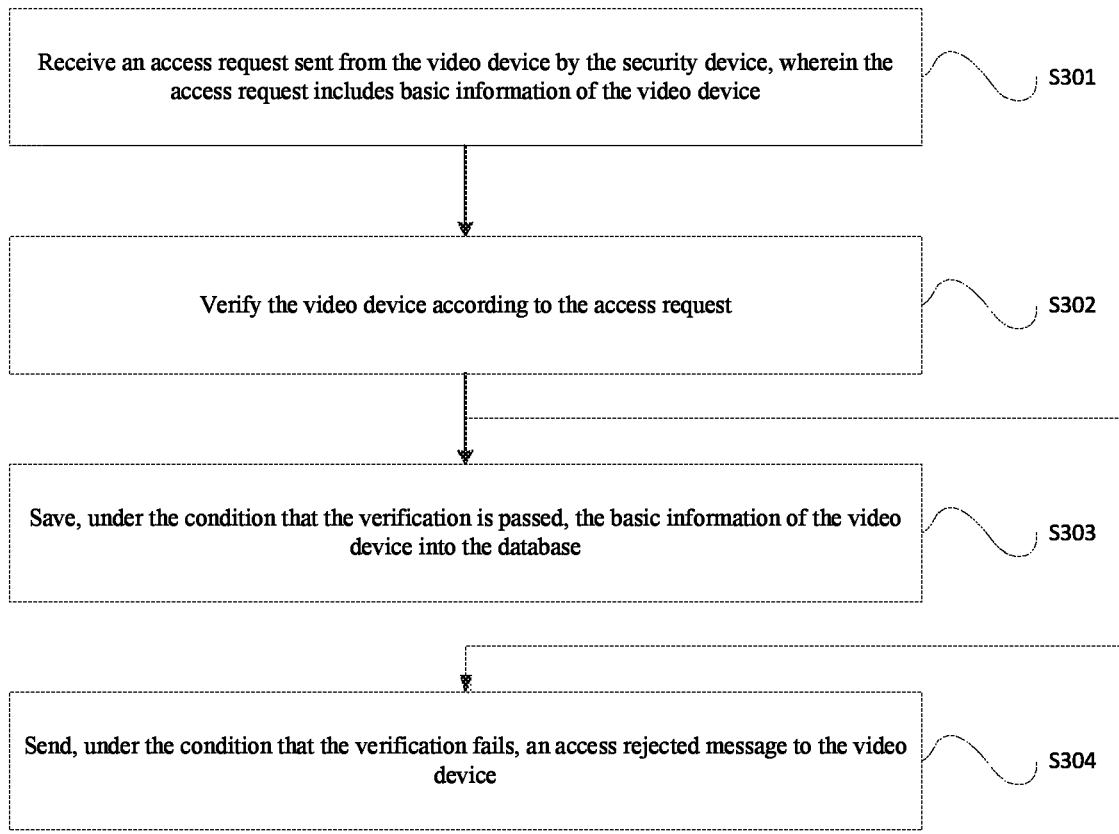
FIG. 3 is a schematic flowchart illustrating some steps of a convergence method according to an embodiment of the present disclosure.

Further, in some implementations, referring to FIG. 3, accessing, via the security device of the railway video resource interconnection and convergence system, the video device to the railway video sharing cloud platform of the railway video resource interconnection and convergence system (step S201) includes the following operations S301 to S304.

At S301, receiving an access request sent from the video device by the security device, wherein the access request includes basic information of the video device.

At S302, verifying, according to the access request, the video device.

At S303, saving, under the condition that the verification is passed, the basic information of the video device into the database.

At S304, sending, under the condition that the verification fails, an access rejected message to the video device.

Specifically, under the condition that the video device is a national standard device, basic information, including field information such as an ID, a DOMAIN, an IP, a PORT, a USERNAME, a PASSWORD and the like, of the national standard device (including a national standard platform or a national standard video camera) desired to be accessed is configured on a WEB page of a railway video sharing cloud platform. The national standard device sends an access request to the railway video sharing cloud platform, which performs authorization verification on the national standard device according to the access request and the basic information of the national standard device. If a query result is legal (i.e., the verification is successful), the registration is successful, and the basic information of the international device is saved in a database connected with the railway video sharing cloud platform. If the query result is not legal, the registration is rejected, i.e., an access rejected message is sent to the international device.

Under the condition that the video device is a railway standard device (including a railway standard platform), the specific process may include configuring basic information, including field information such as an ID, an IP, a PORT, a USERNAME, a PASSWORD and the like, of the railway standard device desired to be accessed on a WEB page of a railway video sharing cloud platform, and saving the basic information in the database to complete resource configuration of the railway standard platform.

Under the condition that the video device is a video camera or NVR/DVR, the specific process may include configuring basic information, including field information such as an ID, an IP, a PORT, a USERNAME, a PASSWORD and the like, of the video camera or NVR/DVR desired to be accessed on a WEB page of a railway video sharing cloud platform, and saving the basic information in the database to complete resource configuration of the video camera or NVR/DVR.

Figure 4:
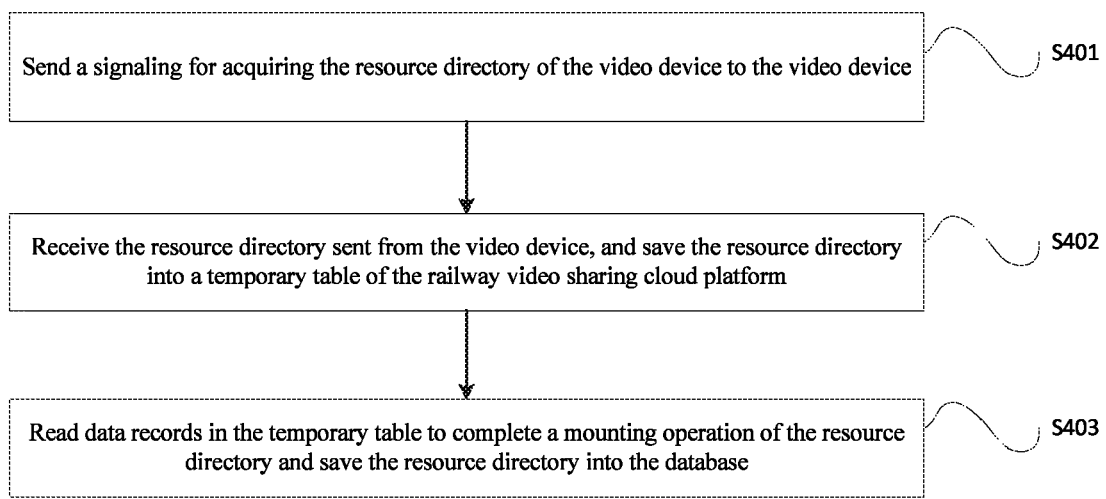
FIG. 4 is a schematic flowchart illustrating some steps of a convergence method according to an embodiment of the present disclosure.

Further, in some implementations, referring to FIG. 4, writing the resource directory of the video device into the database connected to the railway video sharing cloud platform (step S202) includes the following operations S401 to S403.

At S401, sending a signaling for acquiring the resource directory of the video device to the video device.

At S402, receiving the resource directory sent from the video device, and saving the resource directory into a temporary table of the railway video sharing cloud platform.

At S403, reading data records in the temporary table to complete a mounting operation of the resource directory and save the resource directory into the database.

Under the condition that the video device is a national standard device successfully registered, the railway video sharing cloud platform initiates a signaling for acquiring a resource directory of the video device, where the signaling content should include basic information, including the ID, DOMAIN, IP, PORT, USERNAME and PASS SWORD fields of the national standard device.

After receiving the signaling for acquiring the resource directory of the video device, the national standard device sends the video resource directory to a temporary table in a database connected with the railway video sharing cloud platform.

The railway video sharing cloud platform reads the data records in the temporary table on a WEB configuration page, completes a mounting operation of the resource directory, and saves the resource directory of the video device to a resource table of the database to complete storage of the resource directory, where the directory information of all video resources is saved in the resource table of the database to complete convergence of the video resources.

Under the condition that the video device is a railway standard device with successful resource configuration, the railway video sharing cloud platform initiates a signaling for acquiring a resource directory of the video device, where the signaling content should include basic information, including the ID, IP, PORT, USERNAME and PASS SWORD fields of the railway standard platform.

The railway video sharing cloud platform sends a login request to the railway standard platform, and after being authorized to login the railway video sharing cloud platform, the railway standard platform sends the video resource directory information to a temporary table in a database connected with the railway video sharing cloud platform.

The railway video sharing cloud platform reads the data records in the temporary table on a WEB configuration page, completes a mounting operation of the resource directory, and saves the resource directory of the video device to a resource table of the database to complete storage of the resource directory, where the directory information of all video resources are saved in the resource table of the database to complete convergence of the video resources.

Under the condition that the video device is a video camera or NVR/DVR with successful resource configuration, the railway video sharing cloud platform initiates a signaling for acquiring a resource directory of the video device, where the signaling content should include basic information, including the ID, IP, PORT, USERNAME and PASS SWORD fields of the video camera or NVR/DVR platform.

The railway video sharing cloud platform sends a login request to the video camera or NVR/DVR, and after being authorized to login the railway video sharing cloud platform, the video camera or NVR/DVR sends the video resource directory information to a temporary table in a database connected with the railway video sharing cloud platform.

The railway video sharing cloud platform reads the data records in the temporary table on a WEB configuration page, completes a mounting operation of the resource directory, and saves the resource directory of the video device to a resource table of the database to complete storage of the resource directory, where the directory information of all video resources are saved in the resource table of the database to complete convergence of the video resources.

Further, in some implementations, an embodiment of the present disclosure further includes unified management of video resources.

An administrator user of the railway video sharing cloud platform may perform management operations such as adding, deleting, modifying and searching on all converged video resources to implement unified management of the resources, including the following cases:

an administrator user of the railway video sharing cloud platform has a right to perform video calling and/or video holder operation on all the converged video resources;

an administrator user of the railway video sharing cloud platform may perform authorization management on resource use and control of all non-administrator users;

a non-administrator user of the railway video sharing cloud platform may perform video calling and/or video holder operation according to the authorization; and a system operation log of the railway video sharing cloud platform may uniformly manage operations of video sources, calling, control, downloading and the like.

Figure 5:
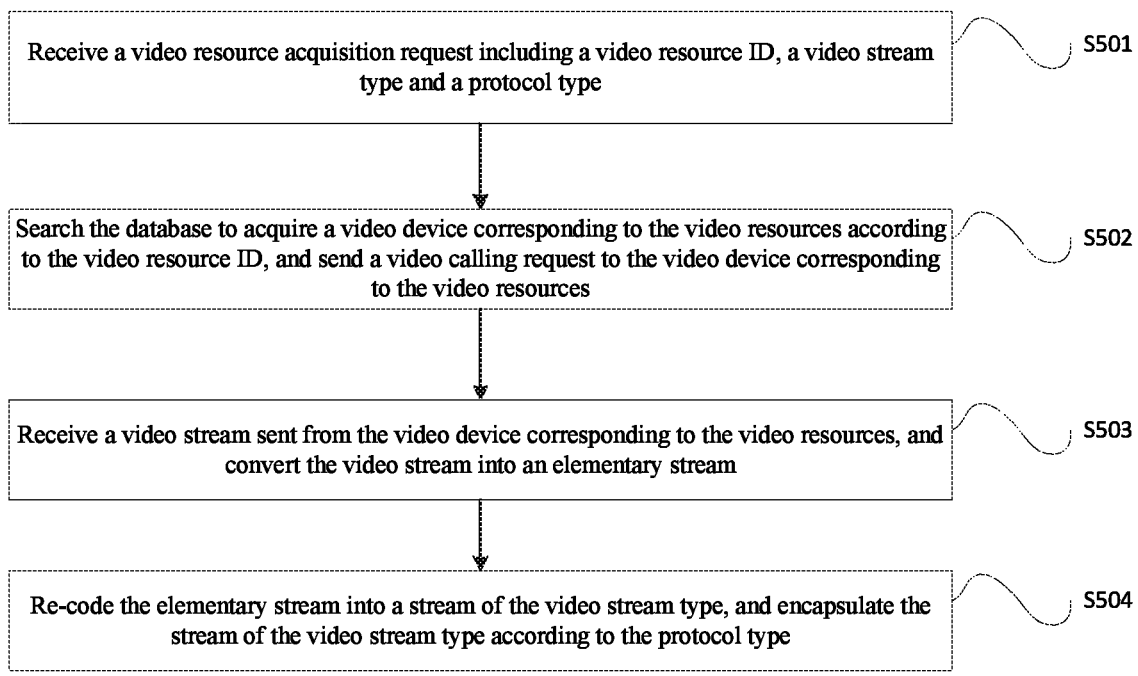
FIG. 5 is a schematic flowchart illustrating some steps of a convergence method according to an embodiment of the present disclosure.

Further, as shown in FIG. 5, after writing the resource directory of the video device into the database connected to the railway video sharing cloud platform, the method further includes the following steps S501 to S504.

At S501, receiving a video resource acquisition request including a video resource ID, a video stream type and a protocol type.

At S502, searching the database to acquire a video device corresponding to the video resources according to the video resource ID, and sending a video calling request to the video device corresponding to the video resources.

At S503, receiving a video stream sent from the video device corresponding to the video resources, and converting the video stream into an elementary stream.

At S504, re-coding the elementary stream into a stream of the video stream type, and encapsulating the stream of the video stream type according to the protocol type.

After the video resource directory is mounted, the railway video sharing cloud platform is docked with the respective railway standard platform, the national standard platform and a third party platform to realize calling of the video resources, including:

establishing a permission for a user desired to access the railway video sharing cloud platform; accessing, by a user client via the railway video sharing cloud platform, a video image within the permission, and sending, by the user client, a video resource acquisition request for acquiring a video corresponding to a video resource ID (res ID) to the railway video sharing cloud platform, where the video resource acquisition request further includes a video stream type and a protocol type;

searching, by the railway video sharing cloud platform, the database according to the video res ID, to acquire a location of the video resource (i.e., a video device where the video resource is located), return routing information and send a video calling request to the video device;

sending, by the video device in response to the video calling request from the railway video sharing cloud platform, a video stream corresponding to the video resource to the railway video sharing cloud platform;

converting, through a protocol conversion service of the railway video sharing cloud platform, the stream into a standard elementary stream (ES stream) according to a uniform format;

re-coding, by the railway video sharing cloud platform, the standard ES stream according to a video stream type requested by a user, to generate a video stream (in the format of H264, H265 or the like) satisfying the user request;

encapsulating, by the railway video sharing cloud platform according to a protocol type (railway standard protocol, or national standard protocol) requested by the user, the obtained video stream in the protocol format (such as a national standard PS packet, a railway standard packet, an RTP packet or the like) requested by the user to generate a new stream; and sending the new stream forwarded by streaming media to a client of a user to complete the video calling.

Finally, it should be noted that the above embodiments are only used to illustrate the technical solutions of the present disclosure, and not to limit it; although the present disclosure has been described in detail with reference to the foregoing embodiments, it should be understood by those of ordinary skill in the art that: modifications may still be made to the technical solutions described in the foregoing embodiments, or equivalents may be substituted for some of the technical features thereof, without departing from the spirit or scope of the technical solutions of the embodiments of the present disclosure.

What is claimed is:

1. A railway video resource interconnection and convergence system, characterized in that the railway video resource interconnection and convergence system comprises:

a security device and a railway video sharing cloud platform; the security device is a function device having a Network Address Translation function or a Virtual Local Area Network function, the security device is configured to map, under the condition that a first resource network is physically isolated from other resource networks by the Virtual Local Area Network function, an internet protocol address of the first resource network of video resources in a video device to an internet protocol address of a shared network by the Network Address Translation function, wherein video resource identifiers of the video device are corresponding to the identifier of the video device, and the first resource network is a network where the video resources are located, and the other resource networks are networks where other video resources are located;

the shared network is a network corresponding to the railway video resource interconnection and convergence system; and the video resources and the other video resources are video resources of a railway video monitoring system; and the railway video sharing cloud platform performs information interaction with the video device through the security device, and is configured to acquire, according to 2/17 the internet protocol address of the shared network corresponding to the video resources, a stream of the video resources, and convert the stream of the video resources into a stream of a preset standard format, and/or convert a stream of a standard format corresponding to the video resources into code streams of other formats.

2. The railway video resource interconnection and convergence system according to claim 1, characterized in that the security device is further configured to perform security detection on the video resources.

3. The railway video resource interconnection and convergence system according to claim 1, characterized in that the security device comprises at least one of a firewall, an intrusion detection system, or a gatekeeper.

4. The railway video resource interconnection and convergence system according to claim 1, characterized in that the video resources comprise at least one of video camera resources, national standard platform video resources, railway standard platform video resources, network video recorder video resources, or hard disk video recorder video resources.

5. The railway video resource interconnection and convergence system according to claim 1, characterized in that
converting the stream of the video resources into the stream of the preset standard format comprises: decapsulating a packet corresponding to the video resources, and converting the decapsulated packet into an elementary stream; and
converting the stream of the standard format corresponding to the video resources into the code streams of other formats comprises:
receiving a video acquisition request comprising a video stream type and a protocol type; and
re-coding the elementary stream corresponding to the video resources into a stream of the video stream type, and encapsulating the stream of the video stream type according to the protocol type.

6. The railway video resource interconnection and convergence system according to claim 1, characterized in that the railway video resource interconnection and convergence system further comprises a client, wherein the client is configured to display the video resources.

7. A convergence method based on a railway video resource interconnection and convergence system, the railway video resource interconnection and convergence system comprises:
a security device and a railway video sharing cloud platform;
the security device is a function device having a Network Address Translation function or a Virtual Local Area Network function,
the security device is configured to map, under the condition that a first resource network is physically isolated from other resource networks by the Virtual Local Area Network function, an internet protocol address of the first resource network of video resources in a video device to an internet protocol address of a shared network by the Network Address Translation function, wherein video resource identifiers of the video device are corresponding to the identifier of the video device and the first resource network is a network where the video resources are located, and the other resource networks are networks where other video resources are located; the shared network is a network corresponding to the railway video resource interconnection and convergence system; and the video resources and the other video resources are video resources of a railway video monitoring system; and
the railway video sharing cloud platform performs information interaction with the video device through the security device, and is configured to acquire, according to the internet protocol address of the shared network corresponding to the video resources, a stream of the video resources, and convert the stream of the video resources into a stream of a preset standard format, and/or convert a stream of a standard format corresponding to the video resources into code streams of other formats, characterized in that the convergence method comprises:
accessing, via a security device of the railway video resource interconnection and convergence system, a video device to a railway video sharing cloud platform of the railway video resource interconnection and convergence system, wherein the video device is a device in a railway video monitoring system; and
writing a resource directory of the video device into a database connected to the railway video sharing cloud platform, wherein the resource directory of the video device comprises a correspondence relationship between video resource IDs of the video device and an ID of the video device.

8. The convergence method according to claim 7, characterized in that before accessing, via the security device of the railway video resource interconnection and convergence system, the video device to the railway video sharing cloud platform of the railway video resource interconnection and convergence system, the method further comprises:
constructing a railway video resource interconnection and convergence system.

9. The convergence method according to claim 7, characterized in that accessing, via the security device of the railway video resource interconnection and convergence system, the video device to the railway video sharing cloud platform of the railway video resource interconnection and convergence system comprises:
receiving an access request sent from the video device by the security device, wherein the access request comprises basic information of the video device;
verifying the video device according to the access request;
saving, under the condition that the verification is passed, the basic information of the video device into the database; and
sending, under the condition that the verification fails, information of access rejected to the video device.

10. The convergence method according to claim 9, characterized in that
under the condition that the video device is a national standard device, the basic information of the video device comprises an ID, a domain name, an internet protocol address, a port number, a user name and a password of the video device; and
under the condition that the video device is one of a railway standard device, a video camera, a network video recorder or a hard disk video recorder, the basic information of the video device comprises an ID, an internet protocol address, a port number, a user name and a password of the video device.

11. The convergence method according to claim 7, characterized in that writing the resource directory of the video device into the database connected to the railway video sharing cloud platform comprises:
sending a signaling for acquiring the resource directory of the video device to the video device;
receiving the resource directory sent from the video device, and saving the resource directory into a temporary table of the railway video sharing cloud platform; and
reading data records in the temporary table to complete a mounting operation of the resource directory and save the resource directory into the database.

12. The convergence method according to claim 7, characterized in that after writing the resource directory of the video device into the database connected to the railway video sharing cloud platform, the method further comprises:
receiving a video resource acquisition request comprising a video resource ID, a video stream type and a protocol type;

searching the database to acquire a video device corresponding to the video resources according to the video resource ID, and sending a video calling request to the video device corresponding to the video resources;

receiving a video stream sent from the video device corresponding to the video resources, and converting the video stream into an elementary stream; and re-coding the elementary stream into a stream of the video stream type, and encapsulating the stream of the video stream type according to the protocol type.

\* \* \* \* \*